(12) United States Patent
Kim

(10) Patent No.: US 8,173,291 B2
(45) Date of Patent: May 8, 2012

(54) ELECTRODE PACKAGE AND SECONDARY BATTERY USING THE SAME

(75) Inventor: Hyon-Sok Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1077 days.

(21) Appl. No.: 11/131,959

(22) Filed: May 18, 2005

(65) Prior Publication Data

US 2005/0260489 A1 Nov. 24, 2005

(30) Foreign Application Priority Data

May 19, 2004 (KR) ........................ 10-2004-0035480

(51) Int. Cl.
*H01M 4/00* (2006.01)
(52) U.S. Cl. ...................... 429/122; 429/130; 429/131
(58) Field of Classification Search .................. 429/122, 429/163, 164, 211, 183, 178, 129, 245, 130, 429/131
See application file for complete search history.

(56) References Cited

U.S. PATENT DOCUMENTS

| | | | |
|---|---|---|---|
| 6,730,438 B2 * | 5/2004 | Nakanishi et al. | 429/245 |
| 6,896,993 B2 * | 5/2005 | Hozumi et al. | 429/130 |

FOREIGN PATENT DOCUMENTS

| | | |
|---|---|---|
| CN | 2604780 Y | 2/2004 |
| JP | 10-92469 A | 4/1998 |
| JP | 11-185725 A | 7/1999 |
| JP | 2000-40502 A | 2/2000 |
| JP | 2001-23643 | 1/2001 |

OTHER PUBLICATIONS

Chinese Patent Abstracts for Chinese patent CN2604780 Y, issued Feb. 25, 2004, in the name of Li Wei et al.
Patent Abstracts of Japan, Publication No. 2001-023643, dated Jan. 26, 2001, in the name of Kenji Shimazu et al.

* cited by examiner

*Primary Examiner* — Cynthia H. Kelly
*Assistant Examiner* — Monique Wills
(74) *Attorney, Agent, or Firm* — Christie, Parker & Hale, LLP

(57) ABSTRACT

A secondary battery includes an electrode assembly having a positive electrode, a negative electrode and a separator interposed between those two electrodes. The secondary battery also includes a container for receiving the electrode assembly inside thereof; a cap assembly electrically connected to the electrode assembly and fixed to the container to seal the container; collector plates electrically connected to the positive electrode and the negative electrodes, and an auxiliary collector plate disposed between at least either the positive or negative electrode and the collector plate corresponding to that electrode.

9 Claims, 5 Drawing Sheets

ELECTRODE PACKAGE AND SECONDARY BATTERY USING THE SAME

CROSS-REFERENCE TO RELATED APPLICATION

This application claims the benefit of and priority to Korean Patent Application No. 10-2004-0035480 filed on May 19, 2004 in the Korean Intellectual Property Office, the entire disclosure of which is incorporated herein by reference.

FIELD OF THE INVENTION

The present invention relates to a secondary battery, and more particularly, to an electrode package for a secondary battery which can prevent fracture of a separator when manufacturing the secondary battery.

BACKGROUND OF THE INVENTION

A low power secondary battery in which one battery cell is made into a battery pack may be used as a power source for various portable electronic devices such as phones, laptop computers, and camcorders. A high power secondary battery in which several to tens of battery cells are made into a battery pack may be used as a power source for motor driven devices such as hybrid electric vehicles.

Depending on their external shape, secondary batteries may be classified into different types, for example, square, cylindrical, and pouch batteries. The secondary battery includes an electrode assembly in which positive and negative electrodes of a belt shape are wound with a separator interposed therebetween. The electrode assembly is placed inside a container, and a cap assembly having an external terminal is mounted on the container.

The positive and negative electrodes have coated regions of collectors which are coated with an active material, and uncoated regions which are not coated with an active material. Conductive taps are attached to the positive and negative uncoated regions, to collect electric current generated from the positive and negative electrodes.

For high power secondary batteries, the collecting structure has a plate-shaped collector plate instead of a conductive tap. The collector plate is electrically connected to the uncoated regions to reduce the internal resistance of the battery. However, because of this structure the separator may be broken during the welding process when the collector plate is fixed to the uncoated region.

In order to fix a collector plate to an uncoated region in an electrode assembly with a jellyroll configuration of a conventional secondary battery, the uncoated region at the end of the electrode is bent to provide surface contact with the collector plate, and then the contact portion is welded to the collector plate by laser welding. However, if the uncoated region is inappropriately bent, therefore causing insufficient surface contact with the collector plate, the separator may be exposed between the uncoated regions, and may be damaged due to contact with a high energy laser during laser welding.

The fracture of a separator can seriously damage the function of the secondary battery, especially a high power secondary battery for motor driven devices such as hybrid electric vehicles.

SUMMARY OF THE INVENTION

A secondary battery and an electrode package therefor are provided which can prevent fracture of a separator when a collector plate is electrically connected to an electrode during manufacturing of the electrode package.

According to one embodiment of the present invention, a secondary battery includes an electrode assembly having a positive electrode, a negative electrode and a separator interposed between those two electrodes. The secondary battery may further include a container for receiving the electrode assembly inside thereof, a cap assembly electrically connected to the electrode assembly and fixed to the container to seal the container, positive and negative collector plates electrically connected to the positive electrode and the negative electrode, respectively, and an auxiliary collector plate disposed between at least either the positive or negative electrode and the collector plate corresponding to that electrode.

Each of the electrodes may have an uncoated region that is not coated with an active material along the edge thereof, and each of the collector plates may be electrically connected to the corresponding uncoated region.

The auxiliary collector plate may be disposed between the positive electrode and the collector plate corresponding to the positive electrode and/or between the negative electrode and the collector plate corresponding to the negative electrode. Further, the auxiliary collector plate may be arranged in a position corresponding to a welding portion of the collector plate, for example, in a cross shape.

The auxiliary collector plate may have substantially the same outer configuration as that of the collector plate. The auxiliary collector plate may also have a hole formed in a position corresponding to an electrolyte injection hole of the collector plate.

The auxiliary collector plate may be made of the same material as that of a collector of the electrode or of the same material as that of the collector plate. Additionally, the auxiliary collector plate may have the same thickness as that of a collector of the electrode.

DETAILED DESCRIPTION

Figure 1:
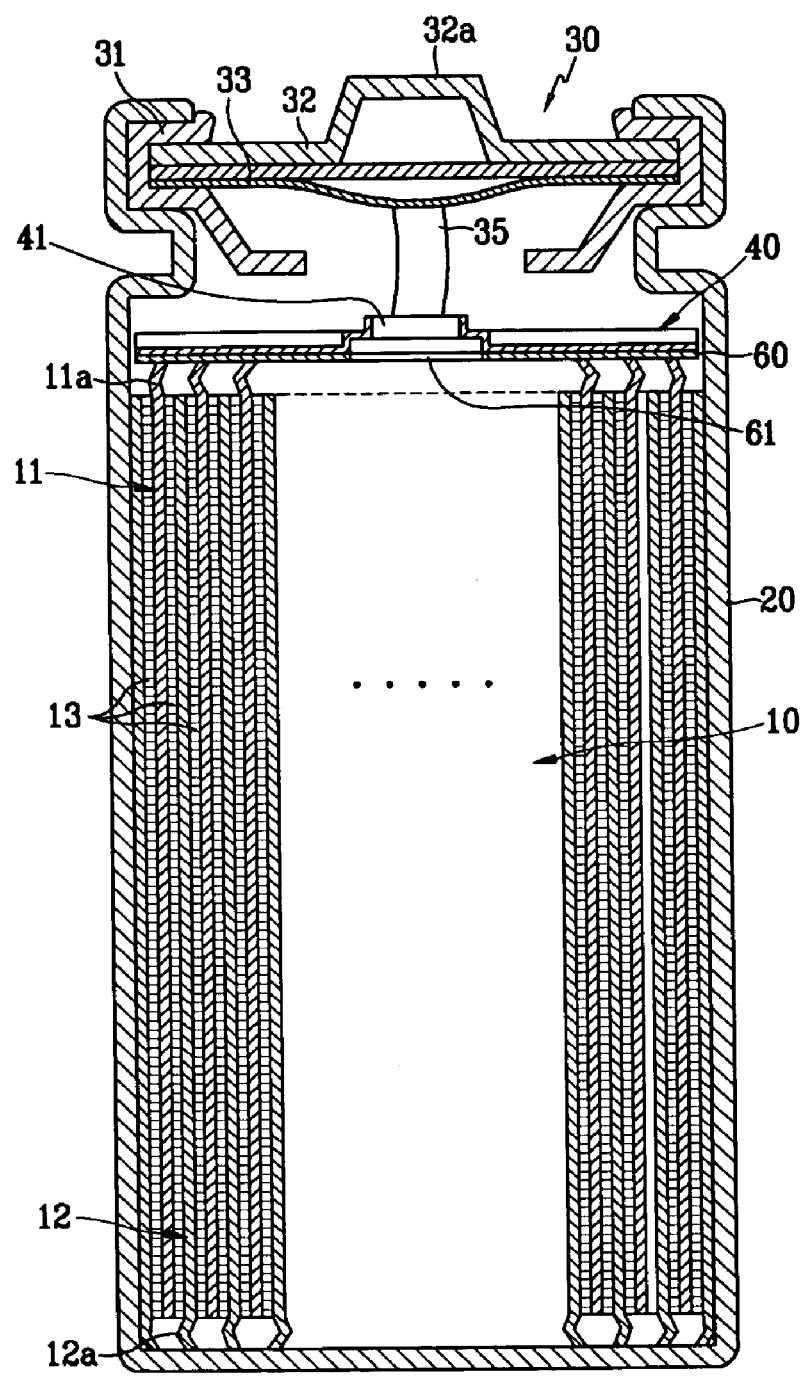
FIG. 1 is a cross-sectional view of a secondary battery according to an embodiment of the present invention.

As shown in the drawings, the secondary battery according to one embodiment of the present invention includes an electrode assembly 10 having a positive electrode 11, a negative electrode 12 and a separator 13 interposed between those two electrodes. The secondary battery also includes a container 20 having an opening at one end thereof to receive the electrode assembly 10 inside the container together with an electrolyte, a cap assembly 30 mounted on the opening of the container 20 through a gasket 31 to thereby seal the container 20, a positive collector plate 40 electrically connected to the positive electrode 11 of the electrode assembly 10, and an auxiliary collector plate 60 disposed between the positive collector plate 40 and the positive electrode 11 of the electrode assembly 10.

The auxiliary collector plate 60 prevents fracture of the separator 13 due to heat energy from a laser when the electrode assembly 10 is fixed to the positive collector plate 40 by laser welding, the details of which will be described below.

The container 20 is made of conductive metal such as aluminum, aluminum alloy, or steel plated with nickel, and it may have various shapes, for example, a cylinder, hexahedron, etc. which have an inner space adapted to receive the electrode assembly 10.

The cap assembly 30 includes a cap plate 32 having an external terminal 32a, and a gasket 31 insulating the cap plate 32 from the container 20. The cap assembly 30 can further include a vent plate 33 which fractures at a prescribed pressure level and discharges trapped gas to thereby prevent the explosion of the battery.

The vent plate 33 is electrically connected to the positive collector plate 40 through a lead 35. The vent plate 33 is not limited to the illustrated shape, but rather it may be any structure able to short circuit the electrical connection between the external terminal 32a and the electrode package through the lead 35 at a prescribed level.

The electrode assembly 10 may have a stacked layer structure such that the separator 13 is interposed between the positive electrode 11 and the negative electrode 12, both of which have collectors coated with active material. Alternatively, the electrode assembly 10 may have a jellyroll structure such that the positive electrode 11, the negative electrode 12 and the separator 13 in a stacked layer are wound into a jellyroll configuration.

The embodiment of FIG. 1 shows an exemplary a secondary battery having a container 20 of cylindrical shape in which the electrode assembly in a jellyroll configuration is mounted.

Figure 4:
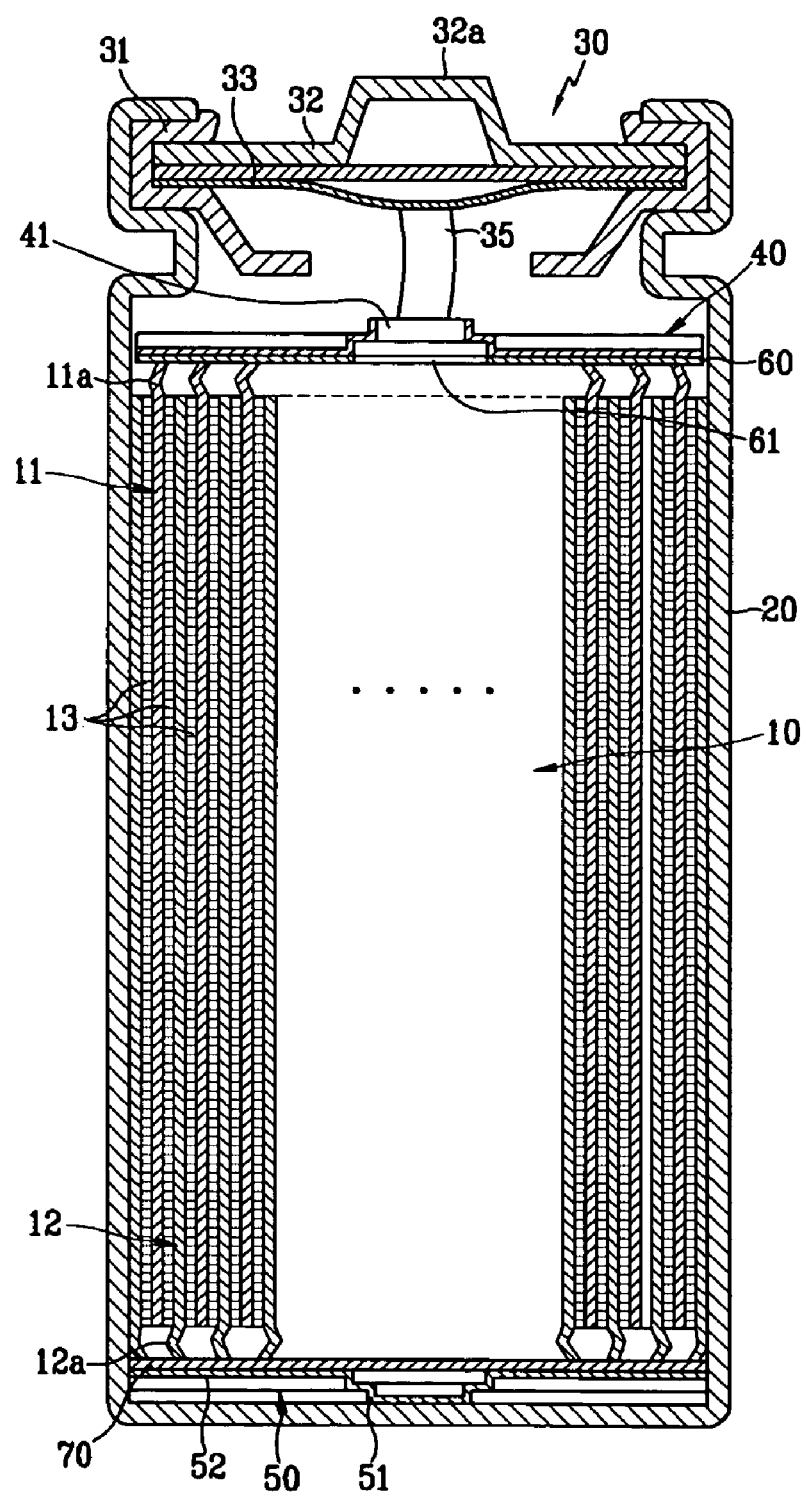
FIG. 4 is a cross-sectional view of a secondary battery according to another embodiment of the present invention.

Additionally, the embodiment includes an exemplary structure wherein an uncoated region formed along the edge of one end of each electrode plate of the electrode assembly 10 is electrically connected to the collector plates 40, 50 (FIG. 4). However, the present invention is not limited to the above structure, and can be applied to any structure regardless of the shapes of the battery and the uncoated region.

The electrode assembly 10 forms an electrode package together with the collector plates 40 and 50 which are electrically connected to the positive electrode 11 and the negative electrode 12, respectively.

Where the secondary battery stands vertically allowing a cap assembly 30 to be disposed on the upper portion of the electrode package, an uncoated region 11a is formed in the upper portion of the positive electrode 11 along the length of the positive electrode. The uncoated region 11 is a thin portion of the collector of the positive electrode 11a which is not coated with an active material.

After the end of the uncoated region is crushed, the uncoated region 11a is electrically connected to the auxiliary collector plate 60 by welding. The auxiliary collector plate 60 is then electrically connected to the positive collector plate 40 by welding.

Similarly, an uncoated region 12a is formed in the lower portion of the negative electrode 12, the uncoated region being a thin portion of the collector of the negative electrode 12 which is not coated with an active material. After the end of the uncoated region is crushed, it is electrically connected to the container 20.

One surface of the auxiliary collector plate 60 is welded to the positive uncoated region 11a, and the other surface is welded to the positive collector plate 40.

Figure 2:
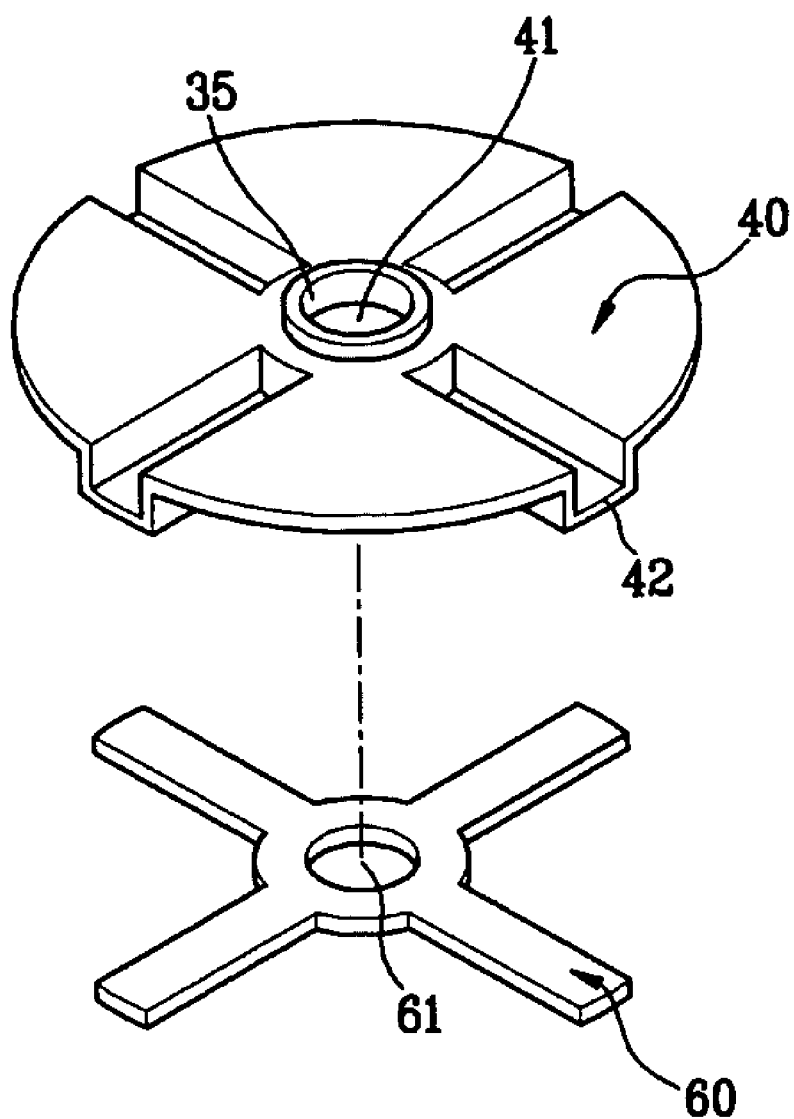
FIGS. 2, 3A and 3B are detailed perspective views of a collector plate and an auxiliary collector plate disposed in a positive electrode of the secondary battery according to an embodiment of the present invention.

The auxiliary collector plate 60 may have, for example as shown in FIG. 2, a cross shape, and it may also have a hole 61 at its center which corresponds to a center hole 41 formed on the positive collector plate 40. Such a structure allows the positive collector plate 40 to be fixed to the positive uncoated region 11a by welding.

With reference to the structure of the positive collector plate 40 and the auxiliary collector plate 60 shown in the drawings, the positive collector plate 40 may have a disk shape as shown in FIG. 2. The positive collector plate may also have a center hole 41 of a round shape at the center thereof, and four contact portions 42 protruding toward the positive uncoated region 11a and arranged in a radial shape with respect to the center hole 41. The contact portions 42 are portions which are substantially welded to the auxiliary collector plate 60 by laser welding and they are arranged in a cross shape with respect to the center hole 41.

According to the structure of the positive collector plate 40, the auxiliary collector plate 60 has a cross shape to correspond to the contact portions 42, and the auxiliary collector plate is interposed between the positive collector plate 40 and the positive uncoated region 11a.

The above structure of the auxiliary collector plate 60 can prevent fracture of the separator 13 of the electrode assembly 10 due to heat energy of a laser when the positive collector plate 40 is welded to the positive uncoated region 11a.

Since the auxiliary collector plate 60 has a shape (for example, the cross shape as described with respect to the above embodiment) adapted to match the substantial welding portion of the positive collector plate 40 and does not have unnecessary elements, the auxiliary collector plate has minimal weight. This minimal weight enables the auxiliary collector plate 60 to reduce the overall weight of the secondary battery.

The shape of the auxiliary collector plate 60 is not limited to the above cross shape, and can vary to correspond to the laser welding portions of the positive collector plate 40. For example, if the laser welding is carried out along one line passing through the center of the positive collector plate, the auxiliary collector plate may have a bar shape with the length corresponding to the diameter of the positive collector plate.

The auxiliary collector plate 60 may be made of the same material as that of the collector of the positive electrode 11, such as copper or aluminum, or as that of the positive collector plate 40, such as nickel. The auxiliary collector plate 60 may also have the same thickness as that of the positive electrode 11.

If the auxiliary collector plate 60 is placed between the positive collector plate 40 and the positive electrode 11 as described above, even where the laser affects the electrode assembly through the positive collector plate when welding the positive electrode 11 to the positive collector plate 40, the laser beam is blocked by the auxiliary collector plate, preventing fracture of the separator 13 by the laser.

The details of the function of the auxiliary collector plate are as follows. When the electrode assembly 10 has a jellyroll configuration, the positive uncoated region 11a and the positive collector plate 40 are perpendicular to each other and it is difficult to weld them directly to one another. To solve this problem, the end of the uncoated region 11a is bent by a crush process and then welded. However, during the crush process, the uncoated region 11a may be bent not in a uniform direction, but rather crushed and bent irregularly as shown in FIG. 1. This irregular bending may cause the separator 13 to be exposed between the uncoated regions 11a.

In the present invention, the auxiliary collector plate 60 is mounted on the exposed separator 13, and thereby the exposed portion of the separator 13 is covered by the auxiliary collector plate 60.

Accordingly, even though the positive collector plate 40 is welded across the exposed separator 13, the auxiliary collector plate 60 can block the influence of energy of welding to the exposed separator 13, which can prevent fracture of the separator due to welding.

Figure 3A:
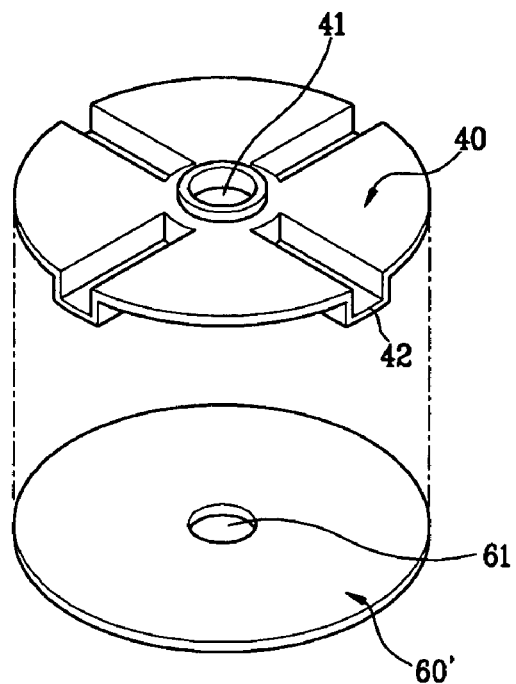

FIG. 3A shows an example illustrating an auxiliary collector plate 60' according to an alternate embodiment of the present invention. As shown in the drawing, the auxiliary collector plate 60' has a disk shape like the positive collector plate 40, and, at the center thereof, has a center hole 61 corresponding to the center hole 41 formed on the positive collector plate 40.

Figure 3B:
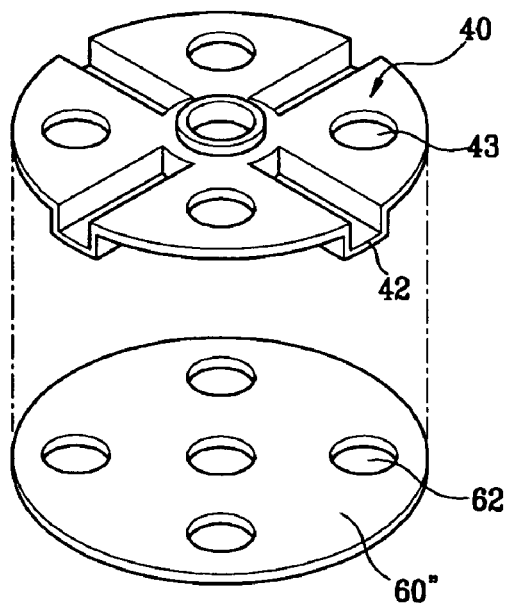

FIG. 3B shows an example illustrating an auxiliary collector plate 60" according to another embodiment of the present invention. The auxiliary collector plate 60" has a disk shape like the positive collector plate 40, and has holes 62 at a position corresponding to electrolyte injection holes 43 formed on the positive collector plate 40.

When an electrolyte is injected into the container 20 through the electrolyte injection holes 43 of the positive collector plate 40, such a structure prevents the auxiliary collector plate 60" interposed between the electrode assembly and the positive collector plate from obstructing injection of electrolyte.

Additionally, according to another embodiment of the present invention as shown in FIG. 4, an auxiliary collector plate 70 may be arranged adjacent to the negative electrode 12 as well as adjacent to the positive electrode 11 with respect to the electrode assembly 10.

In this embodiment, a negative collector plate 50 is placed between the uncoated region 12a of the negative electrode 12 of the electrode assembly 10 and the container 20, and the auxiliary collector plate 70 is placed between the negative collector plate 50 and the uncoated region 12a of the negative electrode 12.

Figure 5:
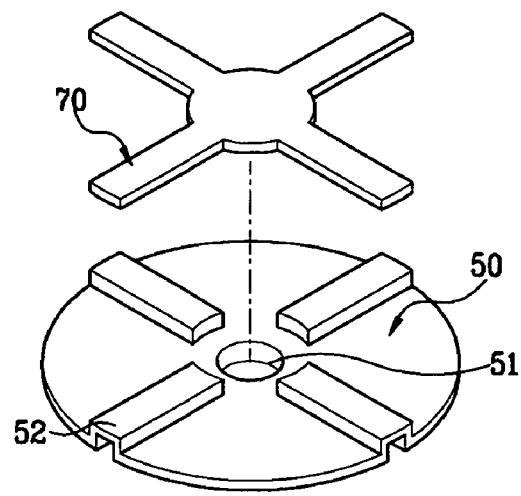
FIGS. 5 and 6 are detailed perspective views of a collector plate and an auxiliary collector plate disposed in a negative electrode of the secondary battery according to another embodiment of the present invention.

As shown in FIG. 5, the negative collector plate 50 has a disk shape. The negative collector plate 50 has a round-shaped groove 51 protruding toward the container 20 at the center thereof to be welded to the inner surface of the container 20, and four contact portions 52 that are radially arranged in a cross shape with respect to the groove 51. The contact portions 52 protrude toward the opposite direction of the groove 51, that is, they protrude toward the uncoated region 12a of the negative electrode 12.

The negative auxiliary collector plate 70 has a cross shape to correspond to the contact portions 52 of the negative collector plate 50 to which they are welded. When the negative auxiliary collector plate 70 is arranged between the negative collector plate 50 and the negative uncoated region 12a, the auxiliary collector plate is interposed between the contact portions 52 and the uncoated region 12a.

Figure 6:
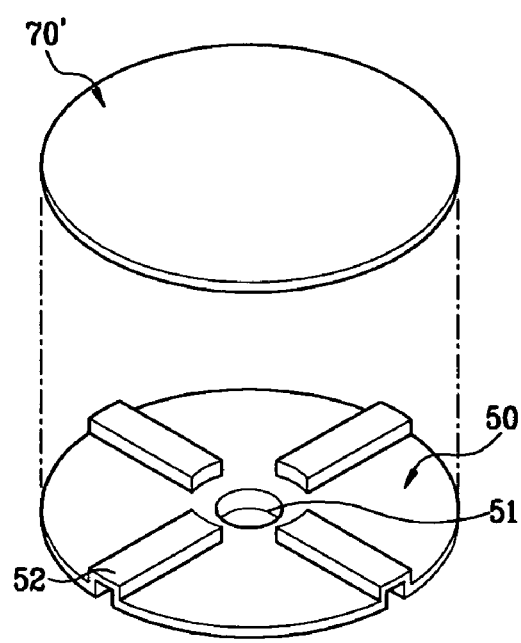

FIG. 6 illustrates a negative auxiliary collector plate 70' according to an alternate embodiment of the present invention. The auxiliary collector plate 70' has a disk shape like the negative collector plate 50.

The negative auxiliary collector plates 70 and 70' have the same function as the positive auxiliary collector plate mentioned above, the details of which will not be described again.

When the electrode assembly is welded to the collector plate, the secondary battery of the present invention with the auxiliary collector plate may prevent fracture of the separator of the electrode assembly due to energy of welding, and thereby it can also prevent a short circuit. Accordingly, the reliability of the battery is increased.

The secondary battery of the present invention may be used as the power source for motor driving devices such as the hybrid electric vehicles, electric vehicles, wireless vacuum cleaners, motorbikes, or motor scooters.

Although exemplary embodiments of the present invention have been shown and described, it will be appreciated by those skilled in the art that changes may be made to these embodiments without departing from the principles and spirit of the invention, the scope of which is defined in the claims and their equivalents.

The invention claimed is:

1. A secondary battery comprising:
    an electrode assembly including a positive electrode, a negative electrode and a separator located between the positive electrode and the negative electrode;
    a container housing the electrode assembly;
    a cap assembly electrically connected to the electrode assembly and fixed to the container to seal the container;
    a lead electrically coupled to the cap assembly;
    a positive collector plate electrically connected to the positive electrode and directly coupled to the lead; the positive collector plate having a positive collector plate electrolyte injection hole; and
    an auxiliary collector plate directly coupled to both the positive electrode and the positive collector plate;
    wherein the auxiliary collector plate has an auxiliary collector plate electrolyte injection opening generally corresponding to the positive collector plate electrolyte injection hole; and
    wherein the auxiliary collector plate and the positive collector plate both comprise the same material.

2. The secondary battery of claim 1, wherein the auxiliary collector plate and the positive collector plate have substantially the same thickness.

3. The secondary battery of claim 1, wherein the secondary battery has a cylindrical shape.

4. The secondary battery of claim 1, wherein the secondary battery is a motor driven device battery.

5. The secondary battery of claim 1, further comprising a negative collector plate connected to the negative electrode.

6. The secondary battery of claim 5, wherein each of the positive electrode and negative electrode has an uncoated region absent an active material along the edge thereof, and each of the positive collector plate and the negative collector plate is electrically connected to the corresponding uncoated region of the positive electrode or the negative electrode, respectively.

7. The secondary battery of claim 1, wherein the auxiliary collector plate generally corresponds to a welding portion of the positive collector plate.

8. The secondary battery of claim 7, wherein the auxiliary collector plate has a cross shape.

9. The secondary battery of claim 1, wherein the auxiliary collector plate and the positive collector plate have substantially the same outer configuration.

* * * * *